No. 874,579. PATENTED DEC. 24, 1907.
P. J. ECKMAN.
BEEHIVE.
APPLICATION FILED DEC. 19, 1906.
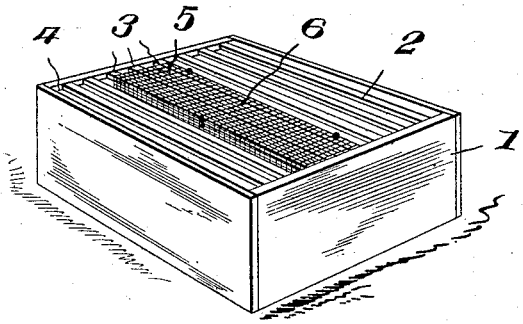
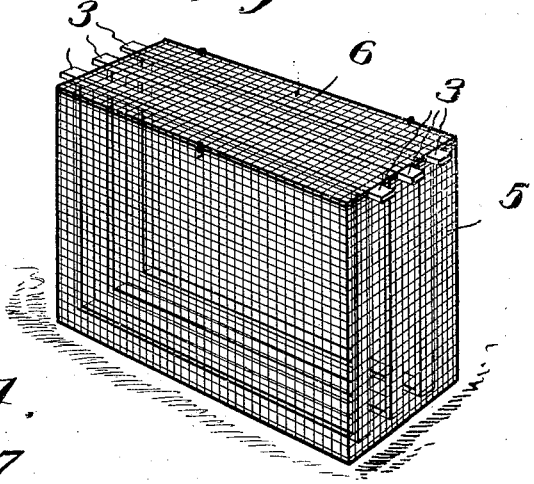
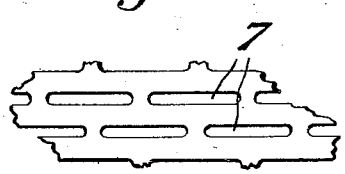
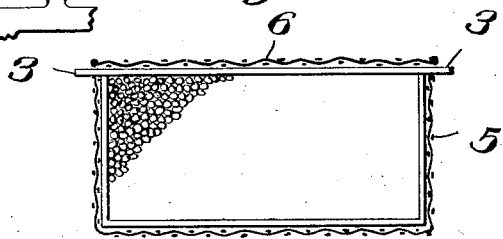
WITNESSES:
INVENTOR
P. J. Eckman
BY
W. J. Fitzgerald & Co.
Attorneys

UNITED STATES PATENT OFFICE.

PETER JOHAN ECKMAN, OF LONG LAKE, MINNESOTA.

BEEHIVE.

No. 874,579.      Specification of Letters Patent.      Patented Dec. 24, 1907.

Application filed December 19, 1906. Serial No. 348,557.

*To all whom it may concern:*

Be it known that I, PETER JOHAN ECKMAN, a citizen of the United States, residing at Long Lake, in the county of Watonwan and State of Minnesota, have invented certain new and useful Improvements in Beehives; and I do hereby declare the following to be a full, clear, and exact description of the invention, such as will enable others skilled in the art to which it appertains to make and use the same.

My invention relates to new and useful improvements in bee-hives and my object is to provide a cage for the hive which is adapted to confine the queen bee to certain parts of the hive.

My object in providing the cage is to prevent the colony from swarming and a further object is to provide a cage of this class whereby the bees other than the queen will have free and ready access to all parts of the hive and also the cage in which the queen bee is confined.

Other objects and advantages will be hereinafter referred to and more particularly pointed out in the claims.

In the accompanying drawings which are made a part of this application, Figure 1 is a perspective view of a hive showing the cover removed and my improved cage in position therein. Fig. 2 is a perspective view of the cage removed from the hive and showing a plurality of comb retaining frames therein. Fig. 3 is a longitudinal sectional view through the cage, and, Fig. 4 is a detail view of a slightly modified form of material for forming the cage.

Referring to the drawings in which similar reference numerals designate corresponding parts throughout the several views, 1 indicates a hive which may be of the usual or any preferred form in which is adapted to be disposed a plurality of comb retaining frames 2, the upper bars of said frames having extensions 3 at each end thereof which are adapted to engage and rest upon a ledge 4 at each end of the hive.

In order to prevent the new colonies from swarming and also for the purpose of providing a place for the queen to lay eggs and rear larvæ for young bees I have provided a cage 5 for the queen bee which is preferably formed of meshed wire and is of sufficient size to receive a number of the comb frames and in order to readily gain access to the cage I have provided a covering 6 which is hingedly secured to the cage 5 so that by opening the cover the comb frames 2 may be readily disposed within the cage and it will be seen that when the queen bee is placed in the cage, the colony will be prevented from swarming as the queen bee cannot depart with them.

The material composing the cage is provided with a mesh of sufficient dimensions to admit the common bees so that the frames within the cage can be filled with comb and honey thereby providing a place for the queen to deposit the eggs and rear the young bees.

Instead of using mesh wire to form the cage, sheet metal may be employed as shown in Fig. 4 of the drawing, said metal being provided with a plurality of slots 7 which answer the same purpose as the meshed wire. As best shown in Figs. 2 and 3 of the drawing the cage snugly fits around the comb frames and the extensions 3 extend through suitable openings in the ends of the cage so that the extensions may engage the ledges in the hive.

The size of the cage may be varied to hold any desired number of frames and the frames within the cage except the one occupied by the queen should be exchanged for frames outside the cage or replaced with drawn combs or foundations and thereby giving the queen ample room for laying eggs and rearing the larvæ for young bees. By providing the queen with the requisite number of frames in the center of the hive, her proper and natural place, and at the same time giving all the other bees excepting the drones, free access to the whole hive inside and outside the cage, each and all will be kept within their proper spheres of duty, labor and indolence and neither realizing the presence of the cage until an attempt at swarming is made and as the queen is unable to follow the colony the bees will invariably return to the hive and remain with the queen.

It will now be seen that I have provided a cheap and durable cage for retaining the queen which can be made to fit any hive and hold any desired number of frames and one that will give the bees a ready access to any part of the hive and cage and at the same time retain the queen within the cage and limit her activities to one or more or all of the frames placed in any one hive. It will also be seen that the cage will prevent swarm ing of the colony and at the same time give the queen ample opportunity and space wherein to lay her eggs and rear the young bees so that the increase of the colony both in numbers and honey producing capacity will progress during the whole season by occasionally introducing frames of fresh drawn combs or foundations. It will likewise be seen that the queen bee can be readily removed from one hive and placed in another if desired.

What I claim is:

1. A hive, comb-retaining frames therein, and a cage removably supported in said hive and having comb-retaining frames therein, and means for inclosing said cage and its frames.

2. A hive, comb-retaining frames therein, and a reticulated cage removably supported in said hive and having comb-retaining frames therein, and means for inclosing said cage and its frames, said cage having a hinged cover of reticulated material 3. A hive, comb-retaining frams therein, and a reticulated cage removably supported in said hive and having comb-retaining frames therein, and means for inclosing said cage and its frames, the frames of the cage having extensions at their ends.

In testimony whereof I have signed my name to this specification in the presence of two subscribing witnesses.

PETER JOHAN ECKMAN.

Witnesses:
B. REMPEL,
J. KOLLER.